No. 758,274. PATENTED APR. 26, 1904.
F. G. PACE.
UNLOADING DEVICE.
APPLICATION FILED JULY 30, 1903.
NO MODEL. 2 SHEETS—SHEET 2.
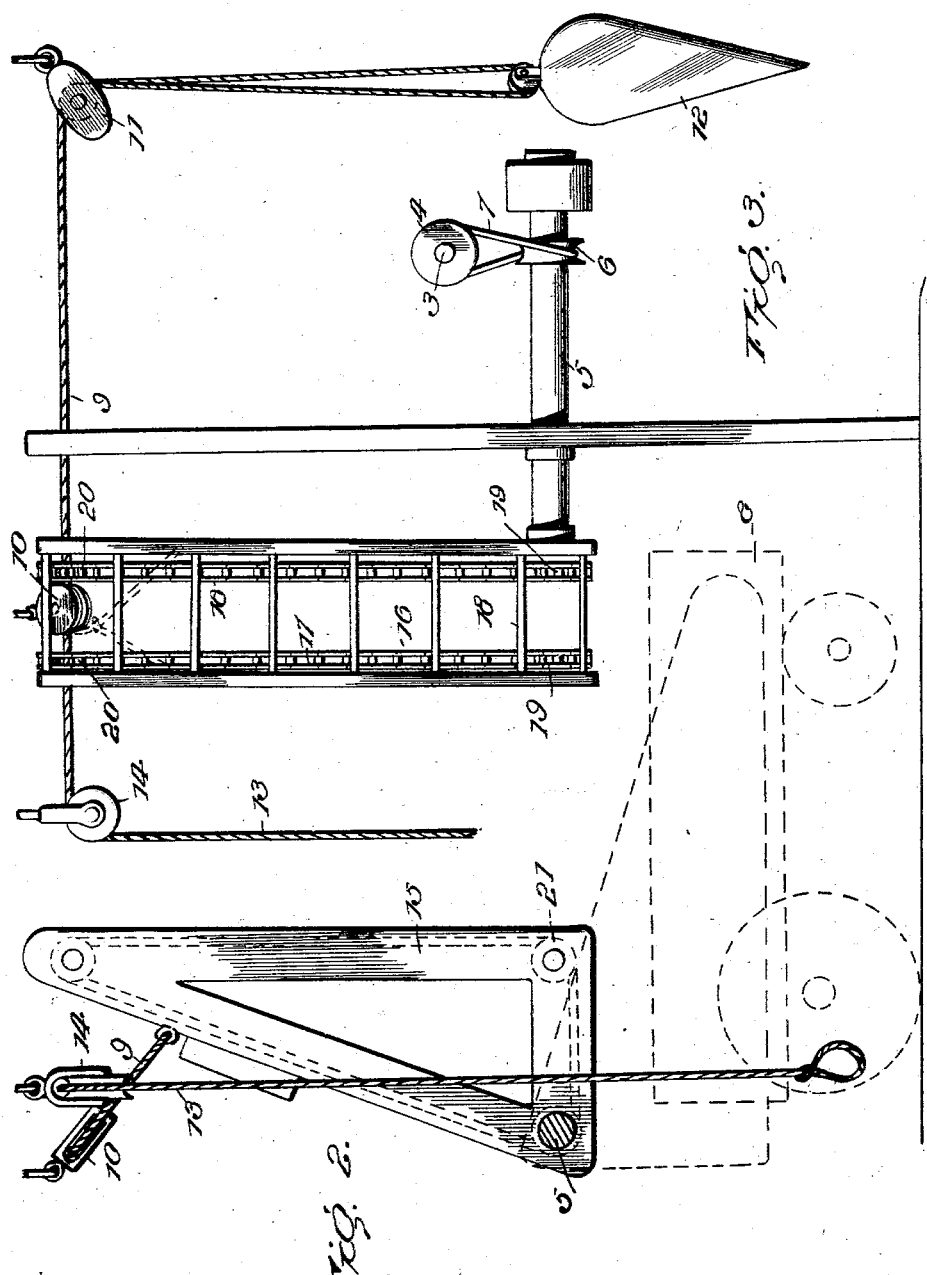
Witnesses
Inventor
F. G. Pace
By R. S. & A. B. Lacey, Attorneys.

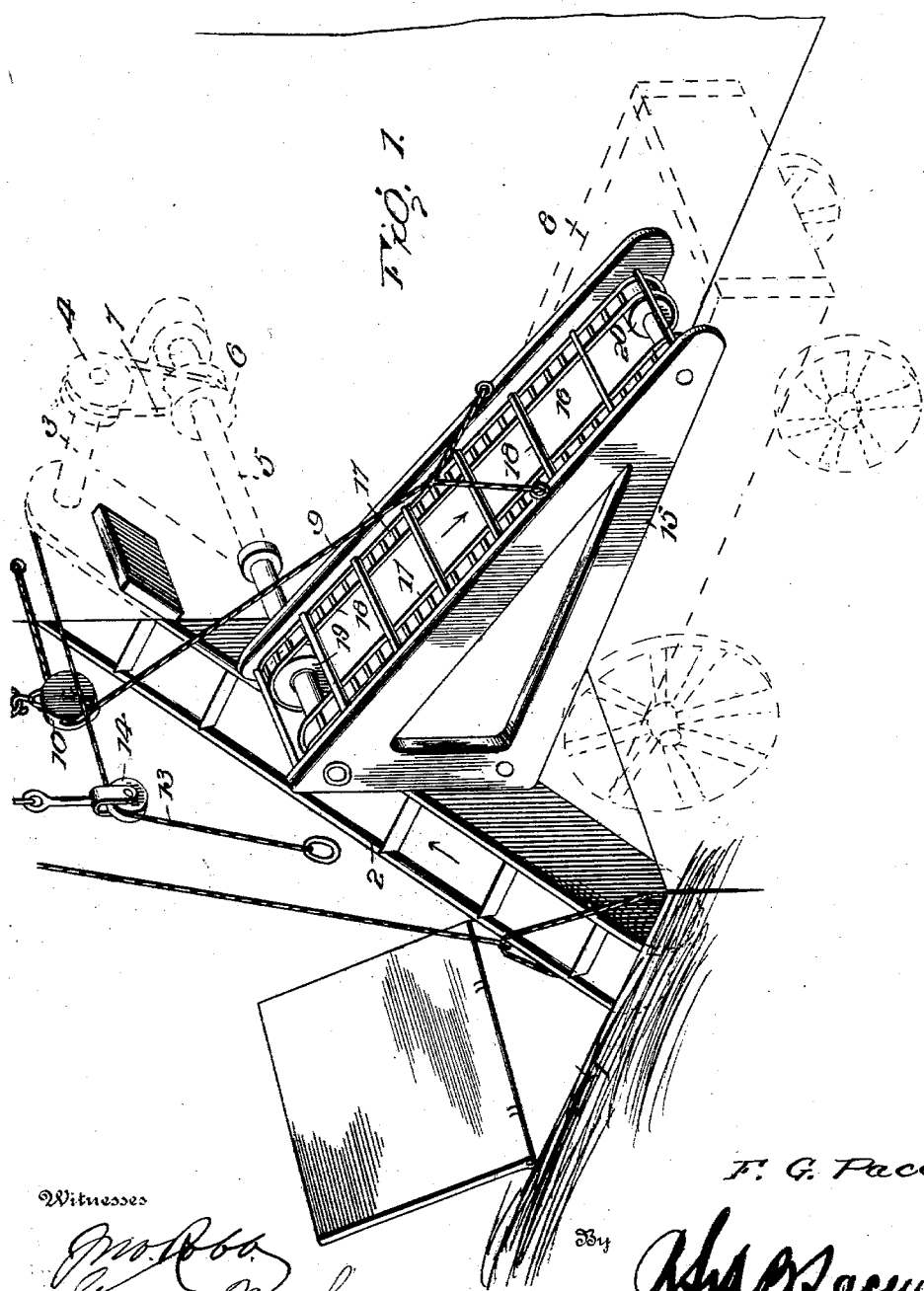

No. 758,274.

Patented April 26, 1904.

UNITED STATES PATENT OFFICE.

FRANKLIN G. PACE, OF CLARINDA, IOWA.

UNLOADING DEVICE.

SPECIFICATION forming part of Letters Patent No. 758,274, dated April 26, 1904.

Application filed July 30, 1903. Serial No. 167,625. (No model.)

*To all whom it may concern:*

Be it known that I, FRANKLIN G. PACE, a citizen of the United States, residing at Clarinda, in the county of Page and State of Iowa, have invented certain new and useful Improvements in Unloading Devices, of which the following is a specification.

The chief purpose of the present invention is to devise a novel mechanism designed most especially for unloading grain from wagons without necessitating the lifting of the wagon-body at its front end to such an angle as to cause the grain or other commodity to discharge by gravitative force from the rear end into a hopper or boot of an elevator, whereby the grain or other commodity is delivered at the required point.

While it is preferred to construct the unloading mechanism in such a manner as to be portable, nevertheless it may be stationary or mounted in any suitable manner to meet the requirements of the work to be performed.

The unloader comprises a frame mounted so as to be elevated out of the way to admit of the loaded wagon being driven thereunder and to be lowered into contact with the load, so as to automatically discharge the same from the wagon into the hopper or boot of the elevator.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view showing the application of the invention. Fig. 2 is a side elevation, the full lines showing the unloading device elevated out of the way and the dotted lines showing it in position for discharging the load. Fig. 3 is a front view.

Corresponding and like parts are referred to in the following description and indicated in all the views of the drawings by the same reference characters.

The hopper or boot into which the grain or other commodity is discharged from the wagon is indicated at 1 and may be of any construction and arrangement and is shown simply to illustrate the application of the invention. The elevator for conveying the grain or commodity to the required point from the hopper or boot 1 is indicated at 2 and may be of any accustomed construction such as employed in grain-elevating apparatus. The traveling belt of the elevator may be run in any manner, and one of the shafts, preferably the upper one, is extended, as shown at 3, and is provided with a pulley 4, from which power is taken for operating a shaft 5, upon which the unloading device is mounted. The shaft 5 is located at any convenient distance from the ground so as to admit of a loaded wagon being driven thereunder, and is provided with a pulley 6, which is connected by a belt 7 with the pulley 4. The unloading device is loosely mounted upon the shaft 5, so as to turn thereon to occupy a position out of the way, as shown by the full lines in Fig. 2, or to engage with the grain or commodity to be unloaded from the wagon 8, as shown by the dotted lines in said Fig. 2. A rope, cable, or chain 9 is connected at one end with the unloading device and passes over pulleys 10 and 11 and is provided with a weight 12 at its opposite end which counterbalances the unloader and when unrestrained holds the unloader up out of the way, as shown by the full lines in Fig. 2. A pull rope or cord 13 is connected at one end with the weight 12 and passes over pulleys 11 and 14 and extends within convenient reach to be drawn upon when it is required to lift the weight and release the unloader from its influence, thereby permitting the unloader to descend to an operative position upon the grain or other commodity contained in the wagon 8, so as to automatically discharge the same therefrom in the hopper 1.

The unloader comprises a frame 15 and an endless conveyer 16, the latter comprising companion chains or belts 17 and transverse connecting-bars 18. The frame 15 is preferably of triangular shape in side elevation and is loosely hung upon the shaft 5 at or near one of its angles. Sprocket-wheels 19 are secured to the shaft 5, so as to rotate therewith, and other sprocket-wheels 20 and 21 are mounted upon shafts journaled to the side pieces of the frame at or near the other two angles. The sprocket chains or belts 17 are supported by the sprocket-wheels 19, 20, and 21. The bars 18 serve to come in contact with the load and drag the same from the wagon and effect a discharge thereof into the hopper 1, from which it is taken up by the elevator 2 and conveyed to the final point of discharge, which may be a car, granary, bin, or the like.

Normally the elevator 2 and unloader are lifted out of the way and the hopper is closed or folded, so as not to offer any obstruction to the passage of the loaded wagon to effect automatic discharge of the load. After the loaded wagon has passed by the hopper and elevator and to a proper position beneath the unloader the hopper 1 and elevator 2 are adjusted so as to receive the load and the end-gate of the wagon is removed or turned aside, thereby permitting a portion of the grain or load to discharge into the hopper. The rope or cord 13 is drawn upon, so as to lift the weight 12, when the unloader will drop to a position so as to rest upon the load and immediately begins to discharge the same, the unloader by reason of its weight following the grain or load and keeping in contact therewith until the same is discharged from the wagon, after which the rope or cord 12 is released, thereby permitting the weight 12 to descend and counterbalance the unloader and lift the same to a normal position. The hopper 1 is now folded or closed and the elevator 2 moved out of the way, thereby permitting the next wagon to be unloaded to be driven into proper position for a repetition of the operation herein described.

Having thus described the invention, what is claimed as new is—

In means for discharging a loaded wagon, the combination of a hopper for receiving the load, an elevator for conveying the load from the hopper to the required point, a shaft connected with said elevator so as to derive motion therefrom, an approximately triangular-shaped frame comprising spaced side pieces, shafts connecting the said side pieces, sprocket-wheels applied to the said shafts, sprocket-chains supported by means of the said sprocket-wheels, drag-bars connecting the sprocket-chains, a weight connected with the frame to counterbalance and normally hold it up out of the way, and means for releasing the frame from the influence of the counterbalancing-weight to permit it to automatically descend upon the load, substantially as specified.

In testimony whereof I affix my signature in presence of two witnesses.

FRANKLIN G. PACE. [L. S.]

Witnesses:
A. J. HAWLEY,
L. B. MCALPIN.